United States Patent
Candelora et al.

(10) Patent No.: US 11,764,550 B2
(45) Date of Patent: Sep. 19, 2023

(54) CIRCUIT BREAKER WITH PLUG-ON CONNECTOR AND MOUNTING PROTRUSION

(71) Applicant: ABB Schweiz AG, Baden (CH)

(72) Inventors: Andrew Matthew Candelora, East Haven, CT (US); Nagesh Venkata Tumu, Unionville, CT (US); Timothy Thomas, Middletown, CT (US); Jason Edward Harmon, Bristol, CT (US)

(73) Assignee: ABB Schweiz AG, Baden (CH)

( * ) Notice: Subject to any disclaimer, the term of this patent is extended or adjusted under 35 U.S.C. 154(b) by 177 days.

(21) Appl. No.: 17/147,861

(22) Filed: Jan. 13, 2021

(65) Prior Publication Data
US 2022/0224084 A1   Jul. 14, 2022

(51) Int. Cl.
H02B 1/056 (2006.01)
H01H 71/08 (2006.01)
H01R 9/26 (2006.01)

(52) U.S. Cl.
CPC ............. *H02B 1/056* (2013.01); *H01H 71/08* (2013.01); *H01R 9/2633* (2013.01); *H01R 9/2691* (2013.01)

(58) Field of Classification Search
CPC ...... H01R 13/18; H01R 13/652; H01R 24/66; H01H 71/0264; H01H 71/2463; H01H 2235/018; H01H 71/0207; H01H 7/10; H02B 1/04–1/0565
USPC ....... 361/634–636, 652–656, 673; 200/51 R, 200/43.11; 439/214, 652
See application file for complete search history.

(56) References Cited

U.S. PATENT DOCUMENTS

| | | | |
|---|---|---|---|
| 1,795,434 A | 3/1931 | Leppert | |
| 3,786,382 A * | 1/1974 | Powell | H01H 71/528 335/22 |
| 4,459,572 A * | 7/1984 | Fajner | H01H 71/524 335/23 |
| 6,087,914 A * | 7/2000 | Kralik | H01H 71/7418 335/35 |
| 6,242,993 B1 * | 6/2001 | Fleege | H02H 1/0015 336/176 |
| 7,957,122 B2 | 6/2011 | Sharp | |
| 8,929,055 B2 | 1/2015 | Potratz et al. | |
| 8,953,306 B2 | 2/2015 | Wheeler et al. | |
| 9,048,054 B2 * | 6/2015 | Potratz | H01H 9/20 |
| 9,450,359 B2 | 9/2016 | Rathjen et al. | |

(Continued)

OTHER PUBLICATIONS

ABB, Inc., www.electrification.us.abb.com, Q-Line 1/2" Plug-in Circuit Breakers, DET-089C_THQP_Advantage Fact Sheet, 2019 (2 pp).

(Continued)

*Primary Examiner* — William H. Mayo, III
(74) *Attorney, Agent, or Firm* — Greenberg Traurig, LLP (57) ABSTRACT

A circuit breaker that may be plugged onto an electrical panel. The circuit breaker is preferably a low voltage circuit breaker in the range of 120-240 volts. The circuit breaker includes an electrical clip with a curved inner surface that contacts a curved outer surface of an electrical connector on the electrical panel. The circuit breaker includes a protrusion that prevents the circuit breaker from being installed in electrical panels without an electrical connector for the electrical clip to engage.

20 Claims, 9 Drawing Sheets

(56) References Cited

U.S. PATENT DOCUMENTS

| | | |
|---|---|---|
| 9,548,548 B2 | 1/2017 | Portratz et al. |
| 9,806,502 B2 | 10/2017 | Cordova Diaz |
| 9,818,567 B1 * | 11/2017 | Watford ............... H01H 71/128 |
| 10,290,450 B1 * | 5/2019 | Betances Sansur ........................ H01H 71/0264 |
| 2007/0291433 A1 | 12/2007 | Ziegler et al. |
| 2008/0158788 A1 | 7/2008 | Darr et al. |
| 2012/0132506 A1 * | 5/2012 | Potratz .................... H01H 9/20 200/43.11 |
| 2013/0153375 A1 * | 6/2013 | Yang ........................ H01H 9/20 200/43.16 |
| 2013/0329332 A1 | 12/2013 | Funcheon et al. |
| 2016/0293374 A1 | 10/2016 | Chen et al. |

OTHER PUBLICATIONS

General Electric, THQP Circuit Breaker, 139C5337, EXP 1347-C10P3, Dec. 17, 2020 (1 pp).

\* cited by examiner

CIRCUIT BREAKER WITH PLUG-ON CONNECTOR AND MOUNTING PROTRUSION

BACKGROUND

The present inventions relate generally to circuit breakers, and more particularly, to a connection between the circuit breaker and an electrical panel.

Circuit breakers are used to open an electrical circuit when an electrical anomaly has occurred in the circuit, such as a high current draw caused by a short in the circuit. Low voltage circuit breakers, such as circuit breakers rated at 120 or 240 volts, are typically connected to an electrical panel with a plurality of different circuit breakers to provide protection for a plurality of respective electrical circuits in a building, such as a home or commercial building.

In normal use, a circuit breaker remains connected and fixed within the electrical panel. The circuit breaker typically has a switch lever that can be manually operated to open the electrical circuit and to reset the circuit breaker. However, it is common to add circuit breakers to an electrical panel both during new installations and replacements thereafter. For example, as electrical circuits are added to a building, new circuit breakers must be added to the electrical panel. Also, faulty circuit breakers are commonly replaced by removing the faulty circuit breaker and connecting a replacement circuit breaker onto the electrical panel. Since connecting circuit breakers to electrical panels is common, the inventors believe it would be desirable to provide circuit breakers with an easy and reliable connection to the electrical panel.

SUMMARY

A circuit breaker and an electrical panel are described. The circuit breaker may be an electronic circuit breaker (e.g., a ground fault circuit breaker or an arc-fault circuit breaker) with a first electrical clip and a second electrical clip. The first electrical clip may plug onto a neutral bar in the electrical panel. The second electrical clip may plug onto a power supply bus in the electrical panel. The first electrical clip may have a curved inner surface that contacts a curved outer surface of the neutral bar. The engagement between the first electrical clip and the neutral bar makes it easier to install the circuit breaker onto the electrical panel compared to screw type connections. A protrusion may also be provided to prevent the circuit breaker from being installed in electrical panels without a neutral bar. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which:

FIG. 10A is a perspective view of a mounting rail for the circuit breaker of FIG. 9;

FIG. 10B is an enlarged perspective view of the mounting rail of FIG. 10A, FIG. 11 is a perspective view of a non-matching mounting rail that the circuit breaker of FIG. 9 is not installable on;

DETAILED DESCRIPTION

Figures 1, 2, 3:
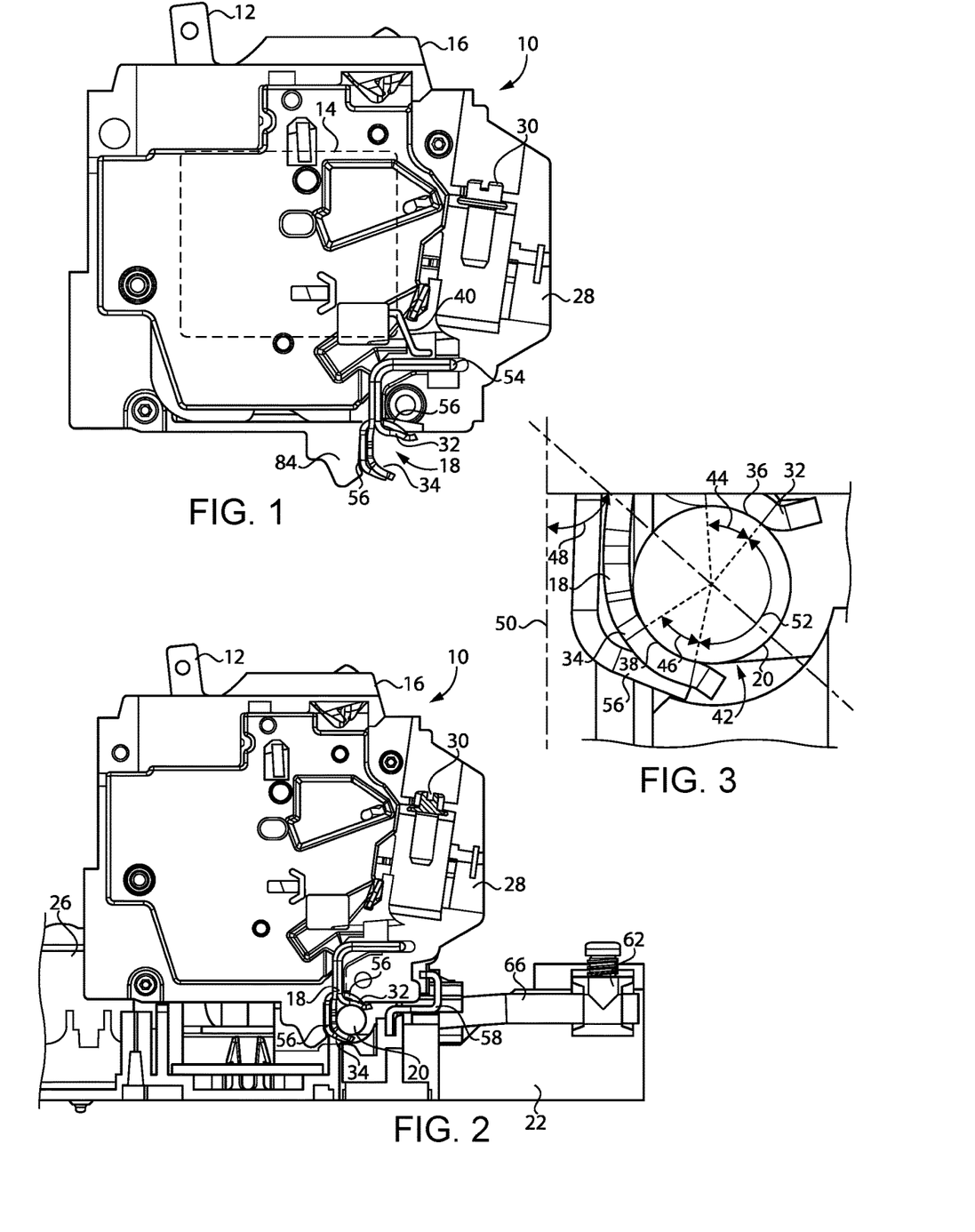
FIG. 1 is a side view of a circuit breaker.
FIG. 2 is a side view of the circuit breaker plugged onto an electrical panel.
FIG. 3 is an enlarged view of a first electrical clip of the circuit breaker plugged onto an electrical connector of the panel.

Referring now to the figures, and particularly FIG. 1, a circuit breaker 10 is shown. As shown, the circuit breaker 10 has a switch lever 12 that may be manually actuated to engage and disengage an electrical switch 14. A housing 16 typically encloses the electrical switch 14. The electrical switch 14 is shown schematically in FIG. 1 without extra details since the operation of circuit breaker switches 14 are well known and not the subject of the present inventions. In general, the electrical switch 14 is set in an engaged mode by the switch lever 12. When an electrical anomaly, such as an overcurrent condition caused by a fault, occurs in the electrical circuit, the electrical switch 14 trips to open the switch 14 and disconnect the electrical circuit from the electrical supply. The switch lever 12 may also be used to manually open the electrical switch 14 to switch it to the disengaged mode if desired.

Figure 5:
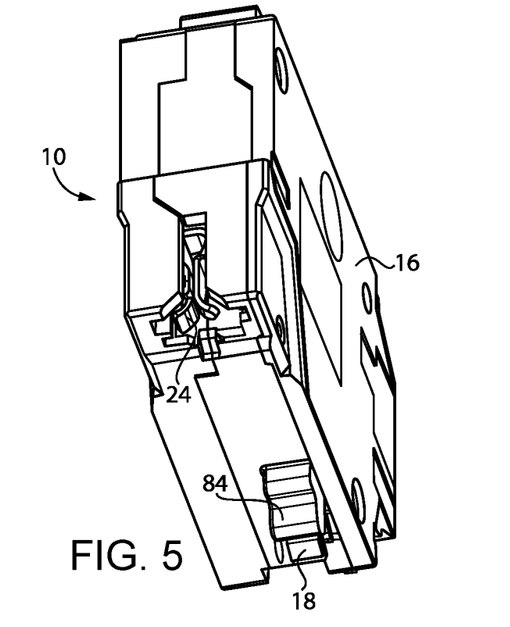
FIG. 5 is a perspective view of a second electrical clip of the circuit breaker.
Figure 6:
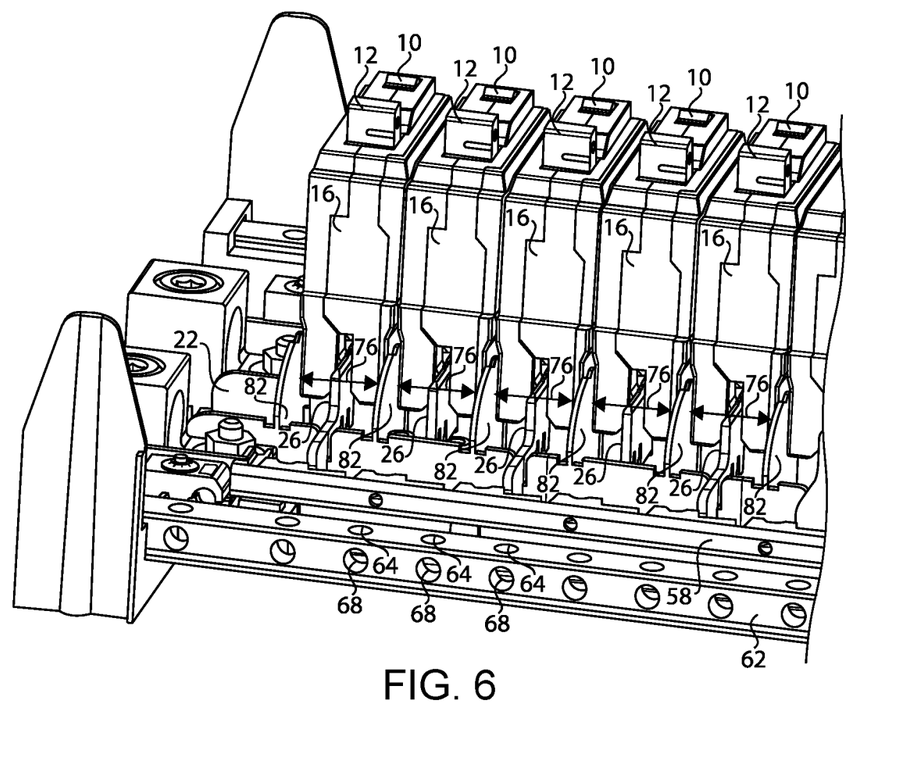
FIG. 6 is a perspective view of a plurality of circuit breakers plugged onto the electrical panel.

The circuit breaker 10 also includes a first electrical clip 18 to make electrical contact with an electrical connector 20 of an electrical panel 22. The electrical clip 18 is electrically connected with the electrical switch 14, e.g., with a wire 40, to transmit an electrical property to the electrical switch 14 that may be used to detect an electrical anomaly in the electrical circuit. It is understood that it is possible for the circuit breaker 10 to have a single first electrical clip 18 connected to the supply bus 26 if desired. Although it is possible for the electrical property to be the main electrical current supplied to the electrical circuit and the electrical anomaly to be an overcurrent condition, it is preferred that the electrical property is a current leakage in the electrical circuit between the electrical power supplied to the circuit and neutral or another anomaly that is detectable through the neutral side of the circuit. In this case, the electrical clip 18 may be connected to a neutral bus connector 20 in the electrical panel 22. The electrical switch 14 may also include a circuit board within the circuit breaker housing 16 to detect current leakage. It is understood that the circuit breaker 10 may have various types of intermediate circuitry between the electrical clip 18 and the electrical switch 14 to detect electrical anomalies. In one example, the electrical clip 18 connected to the electrical switch 14 and connected to neutral 20 makes the circuit breaker 10 a ground fault circuit breaker 10, an arc-fault circuit breaker 10 or a combined ground fault/arc-fault circuit breaker 10, which are types of circuit breakers commonly known in the art. Preferably, the circuit breaker 10 is a low voltage circuit breaker 10 rated at 120 or 240 volts. As shown in FIG. 1, it is preferable for the electrical clip 18 to extend out the bottom of the circuit breaker 10 opposite from the switch lever 12, which extends out the bottom of the circuit breaker 10. It is also preferable for the switch lever 12 and the electrical clip 18 to be on opposite lateral sides of the circuit breaker 10. For example, if a centerline were drawn vertically through the circuit breaker 10 of FIG. 1, the switch lever 12 would be on the left side of the centerline and the electrical clip 18 would be on the right side of the centerline. As shown in FIG. 5, the circuit breaker 10 may also have a second electrical clip 24 that connects to the electrical panel 22. The second electrical clip 24 is preferably on the bottom of the circuit breaker 10 on the opposite lateral side (e.g., left side in FIG. 1) from the first electrical clip 18. Preferably, the second electrical clip 24 is connected to a main electrical supply bus 26 in the electrical panel 22 as shown in FIG. 6. As shown in FIGS. 1 and 2, the circuit breaker 10 may also be provided with a connecting lug 28 that a wire or cable may be connected to. The electrical connecting lug 28 is preferably on the same lateral side as the first electrical clip 18 (i.e., the right side in FIG. 1) and preferably faces out from the side. The wire or cable may be secured to the connecting lug 28 with a screw 30. The second electrical clip 24 and the electrical connecting lug 28 are typically both connected to the electrical switch 14 so that the switch 14 can be opened and closed between the clip 24 and the lug 28 so that the switch 14 can break the supply of electrical current from the second clip 24 to the connecting lug 28 by opening the switch 14.

As shown in FIG. 1, the first electrical clip 18 may have a first elastic arm 32 and a second elastic arm 34. As shown in FIGS. 2-3, the first and second elastic arms 32, 34 may each form first and second curved inner surfaces 36, 38, respectively. The curved inner surfaces 36, 38 of the elastic arms 32, 34 each contact corresponding first and second outer curved surfaces of the electrical connector 20 of the panel 22. As shown, the first and second curved inner surfaces 36, 38 may face each other so that they contact opposite sides of the electrical connector 20 on the panel 22. Thus, in the preferred embodiment, the curved inner surfaces 36, 38 wrap around a portion of the electrical connector 20. At least one of the elastic arms 32, 34, and preferably both of the elastic arms 32, 34, is electrically connected to the electrical switch 14 with a wire 40 or other electrical connector 40 to allow the switch 14 to detect an electrical anomaly through the electrical connector 20 of the panel 22.

Figure 4:
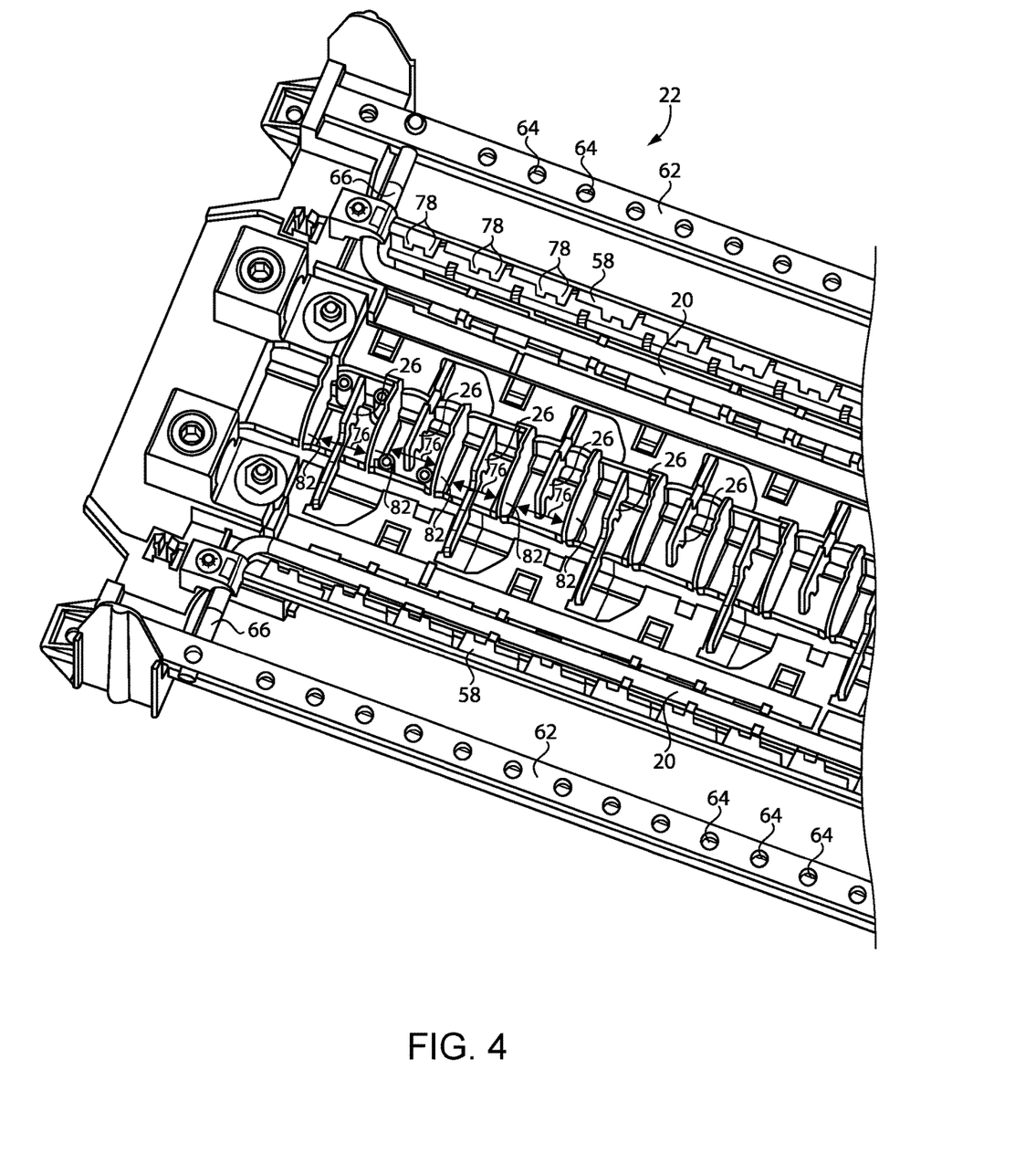
FIG. 4 is a perspective view of the electrical panel.

As shown in FIGS. 3-4, the electrical connector 20 is preferably a round bar 20 with a circular cross-section that extends along a length of the panel 22 that is longer than the width of the circuit breaker 10. That is, the round bar 20 may extend transversely to the circuit breakers 10 so that a plurality of the circuit breakers 10 may be connected to the round bar 20 at the same time (see FIG. 6). As shown in FIGS. 2 and 4, where the connector bar 20 is a neutral bar 20, it is preferable for the neutral bar 20 to be electrically connected to a spaced apart neutral rail 62. The neutral rail 62 is common in electrical panels 22 and has a plurality of ports 68 to connect the neutral wires of the electrical circuits. The neutral wire ports 68 in the neutral rails 62 are on the outer sides of the rail 62 and can be seen in FIG. 6. As shown, the neutral ports 68 are aligned with the screw holes 64 on the top which are used to clamp the neutral wires to the neutral rail 62. As shown in FIG. 4, the connector 66 between the neutral bar 20 and the neutral rail 62 may be a bent portion 66 integral with the neutral bar 20, although another type of connector may be used.

Preferably, the curved inner surfaces 36, 38 of the elastic arms 32, 34 are oriented transversely with respect to the circuit breaker 10 when the respective electrical connector 20 of the panel 22 extends transversely to the circuit breakers 10. As shown in FIG. 3, the ends of the two elastic arms 32, 34 may be separated from each other to form an opening 42 therebetween to insert the electrical connector 20 therethrough to plug the first electrical clip 18 onto the connector 20. Thus, the opening 42 between the first and second curved inner surfaces 36, 38 is preferably large enough to allow the panel connector 20 to pass therethrough. If the opening 42 is smaller than the width of the panel connector 20, it is understood that the elastic arms 32, 34 may be flexed outward if desired to press the first electrical clip 18 onto the panel connector 20. Although the elastic arms 32, 34 may be shaped and sized as desired, it is believed that it may be desirable for the first curved inner surface 36 to wrap around a range 44 of between 40° and 95° where the first surface 36 contacts the panel connector 20. The second curved inner surface 38 also wraps around a range 46 of between 30° and 90° where the second surface 38 contacts the panel connector 20. Preferably, the total contact between the first and second curved inner surfaces 36, 38 and the panel connector is at least 180° (i.e., range 44+range 46). The opening 42 may also be oriented at an angle 48 of between 60° and 90° with respect to a vertical axis 50 through the circuit breaker 10. The size 52 of the opening 42 may also be between 70° and 185°. Preferably, the first and second elastic arms 32, 34 are made of copper and may be connected together with a bend 54 between the arms 32, 34. It is also preferable for a spring 56 to be provided, for example of spring steel, to press the elastic arms 32, 34 toward each other and towards the electrical connector 20 of the panel 22.

Figure 7:
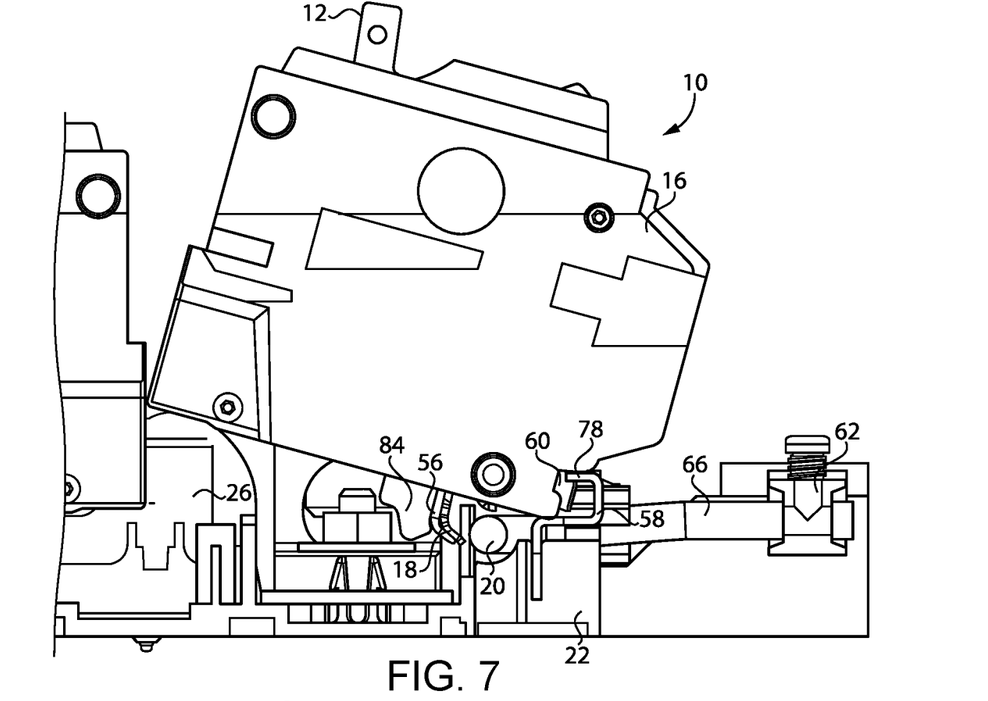
FIG. 7 is a side view of the circuit breaker in the process of being mounted onto the electrical panel.
Figure 8:
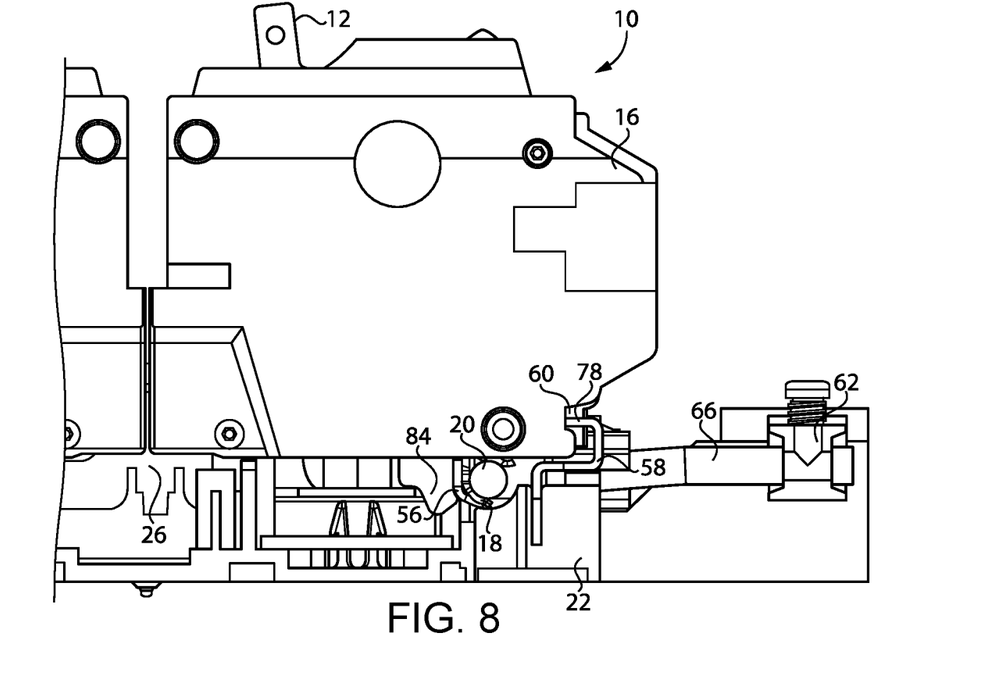
FIG. 8 is a side view of the circuit breaker of FIG. 7 after the circuit breaker has been plugged onto the electrical panel.

The circuit breaker 10 can be plugged onto the electrical panel 22 as shown in FIGS. 7-8. As shown in FIG. 7, the circuit breaker 10 is initially lowered onto the panel 22 at an angle. As shown, it may be desirable to provide the electrical panel 22 with a mounting rail 58 that may also extend transversely across the width of a plurality of circuit breakers 10 (see FIG. 4). The circuit breaker 10 may also be provided with a recess 60 or other structure that engages with the mounting rail 58 as the circuit breaker 10 is lowered onto the panel 22 at an angle. Once the circuit breaker 10 engages the mounting rail 58, the circuit breaker 10 is rotated downward around the mounting rail 58 to plug the first and second electrical clips 18, 24 onto the neutral bar 20 and the power supply bus 26, respectively. It is understood that the mounting rail 58 may not be needed in all embodiments and that the electrical clips 18, 24 may plug onto the panel 22 in different ways if desired. One advantage of the first electrical clip 18 is that the circuit breaker 10 may be more easily connected to the electrical panel 22 since the electrical clip 18 can engage with the neutral bar 20 within a wide range of angles. That is, the angle of attack that the user chooses to use when mounting the circuit breaker 10 is not particularly critical since successful engagement between the clip 18 and the bar 20 is possible within a wide range of attack angles. The connection between the clip 18 and the bar 20 is also rotatable which allows the clip 18 and the bar 20 to be connected or remain connected as the circuit breaker 10 is rotated downward to plug the second electrical clip 24 onto the power supply bus 26. It is understood that the aforementioned steps may be reversed to remove the circuit breaker 10 from the panel 22.

Figure 9:
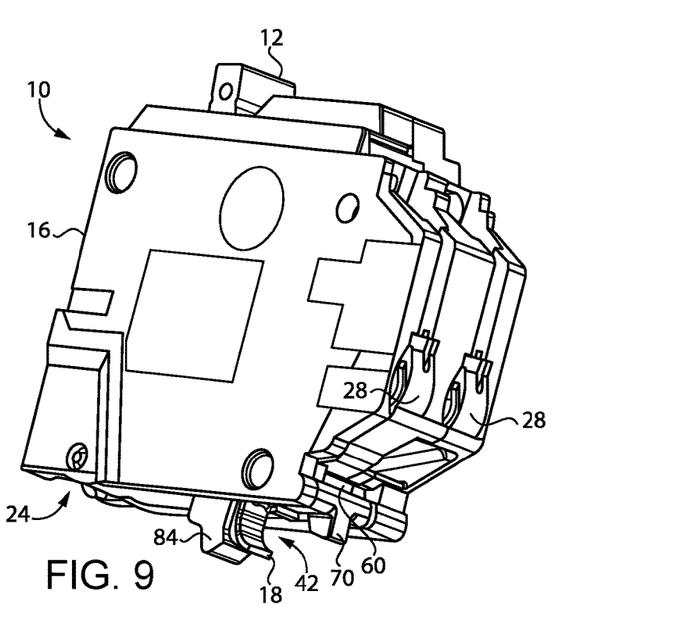
FIG. 9 is a perspective view of another embodiment of the circuit breaker.

As shown in FIG. 9, another embodiment of the circuit breaker 10 is shown with a protrusion 70 extending outward from the housing 16, preferably from the bottom, opposite from the switch lever 12. The protrusion 70 may be used to prevent the circuit breaker 10 from being installed in electrical panels 22B that are not designed for the circuit breaker 10. The protrusion 70 may also be useful in protecting the first electrical clip 18 (also extending downward from the bottom of the circuit breaker 10) from damage during handling.

Figures 10A, 10B, 11:
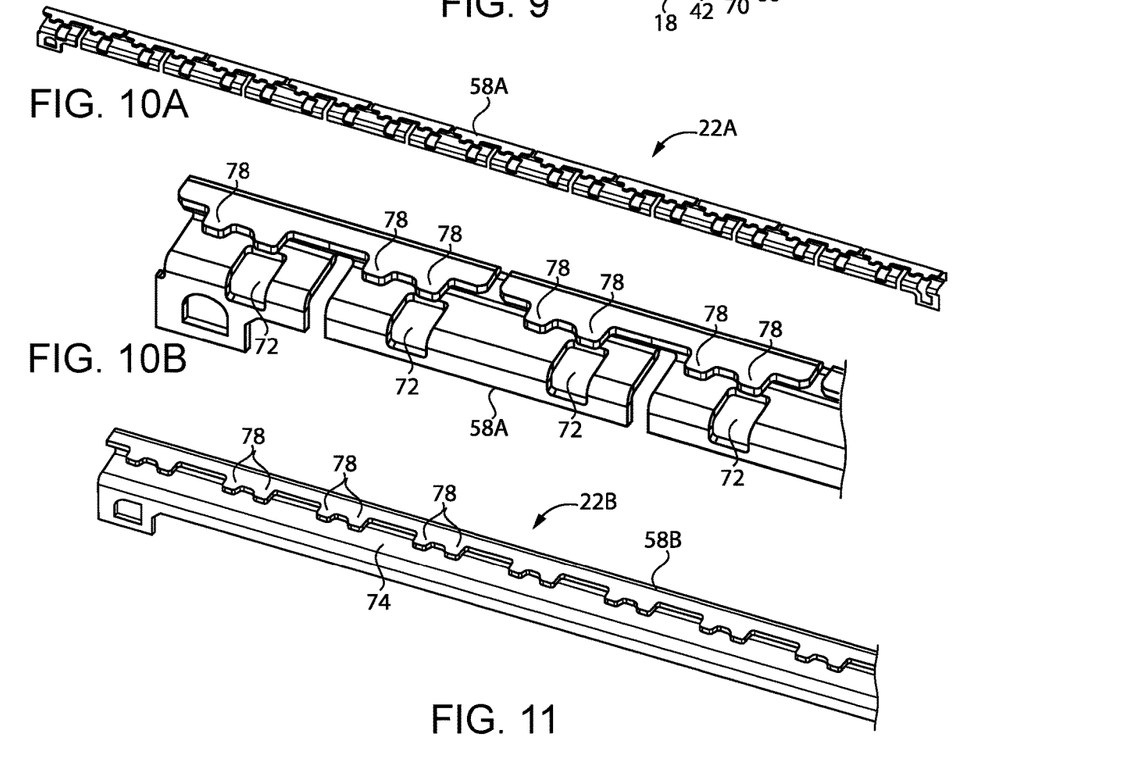

As shown in FIGS. 10A-B, the mounting rail 58A of the electrical panel 22A may be provided with mounting slots 72 that the corresponding circuit breaker protrusion 70 is inserted into when the circuit breaker 10 is plugged into the panel 22A. By contrast, a non-matching mounting rail 58B is shown in FIG. 11 which has no mating slots 72 matching the mating slots 72 of FIGS. 10A-B. It is understood that the mounting rails 58A, 58B of FIGS. 10A-B and 11 may be used in electrical panels 22 like the mounting rail 58 in FIG. 4. In use, the mounting rail 58A of FIGS. 10A-B may be used in first electrical panels 22A that have the neutral bus 20 and electrical supply bus 26 engageable with the first and second electrical clips 18, 24, respectively (ref. FIG. 4). Thus, when the circuit breaker 10 is installed into such a panel 22A, the first electrical clip 18 engages the neutral bar 20, the second electrical clip 24 engages the electrical supply bus 26, and the protrusion 70 engages one of the mating slots 72 by being inserted therein.

On the other hand, second electrical panels 22B may be provided with the mounting rail 58B of FIG. 11. In this case, the panel 22B may not have the neutral bus 20 to engage the first electrical clip 18, but may have a matching electrical supply bus 26 that may engage the second electrical clip 24. This means that if the circuit breaker 10 were installed in such a panel 22B, the circuit breaker 10 would not provide the additional protection features that are possible when the first clip 18 engages a neutral bus 20. Therefore, it may be desirable to prevent the circuit breaker 10 from being installed in the second electrical panels 22B that do not have a neutral bus 20. This may be accomplished by providing the protrusion 70 on the housing 16 of the circuit breaker 10, which will interfere with the bottom portion 74 of the mounting rail 58B in the second electrical panel 22B that does not have mating slots 72 for the protrusion 70. On the other hand, the first electrical panel 22A which has a mounting rail 58A with mating slots 72 permits the circuit breaker 10 to be installed therein since the protrusion 70 can be inserted through a corresponding mating slot 72 without interference.

Figure 12:
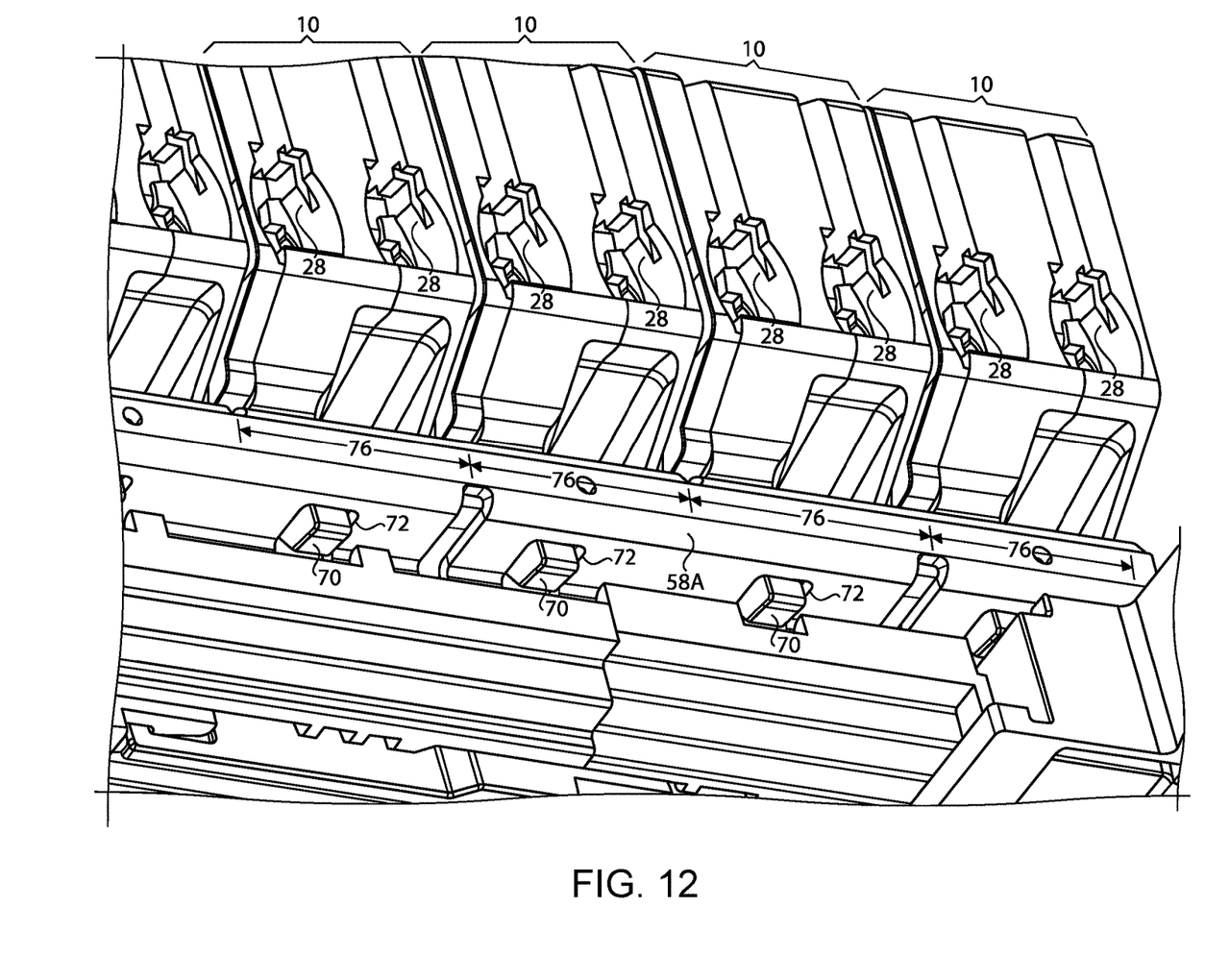
FIG. 12 is a partial perspective view of an electrical panel, showing the mounting rail of FIG. 10A with a plurality of circuit breakers mounted thereon.
Figure 13:
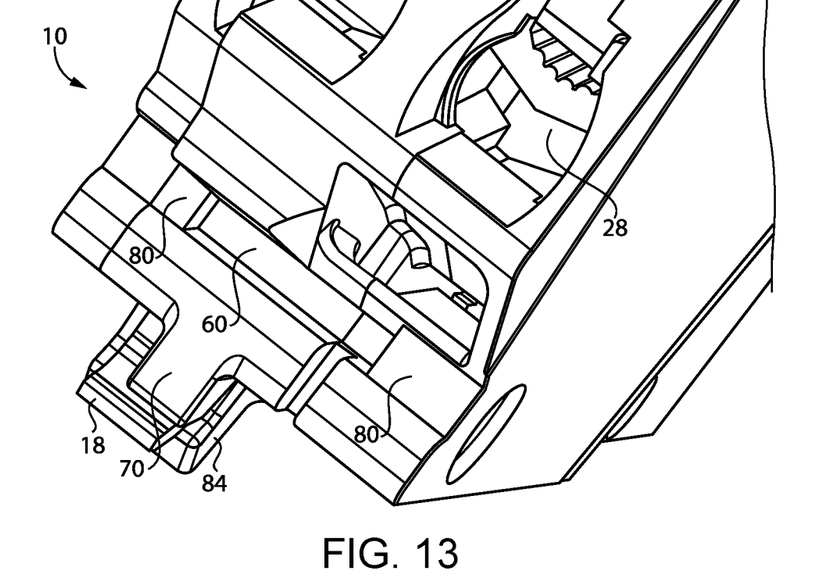
FIG. 13 is a perspective view of a mounting recess of the circuit breaker.

As illustrated in FIGS. 4, 6 and 12, the electrical panel 22 preferably has a plurality of defined mounting sites 76 for mounting a plurality of circuit breakers 10, such that one circuit breaker 10 may be installed in each mounting site 76. As shown in FIGS. 4 and 12, the mounting rail 58 may extend across the plurality of mounting sites 76 so that the circuit breakers 10 engage the same mounting rail 58 (e.g., on one side of the panel 22). Each mounting site 76 may have one mating slot 72 for the protrusion 70 of the circuit breaker 10, and in the most preferred embodiment, every mounting site 76 along the mounting rail 58 has a mating slot 72.

As shown in FIGS. 7-8, and described above, the circuit breaker 10 may be installed in the panel 22 by engaging the rear of the circuit breaker 10 with the mounting rail 58 at an angle. The circuit breaker 10 may then be rotated downward around the engagement with the mounting rail 58 to engage the first clip 18 with the neutral bus 20 and the second clip 24 with the electrical supply bus 26. In addition, as shown in FIG. 12, the protrusion 70 on the circuit breaker 10 is inserted into the corresponding mating slot 72 of the mounting rail 58A as the circuit breaker 10 is rotated downward.

Figure 14:
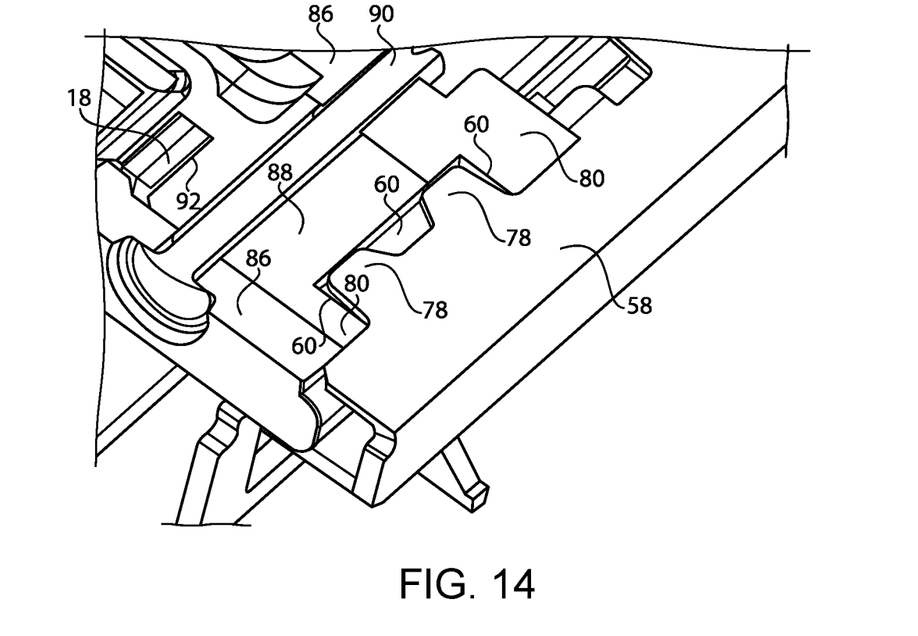
FIG. 14 is a cross-sectional perspective view of a mounting protrusion on the mounting rail and the mounting recess of the circuit breaker engaged therewith.

In order to aid installation of the circuit breaker 10, the mounting rail 58 may be provided with a plurality of mounting protrusions 78 which are each received by a respective mounting recess 60 at the rear of the circuit breaker 10. As shown in FIG. 14, the mounting recess 60 is bordered by webs 80 that surround the mounting protrusion 78 when the circuit breaker 10 engages the mounting rail 58. It is noted that the non-matching mounting rail 58B of FIG. 11 may also have matching mounting protrusions 78 which allows engagement with the mounting recess 60 of the circuit breaker 10. Thus, the mounting protrusions 78 do not prevent installation of the circuit breaker 10 in the second panel 22B. Instead, as described above, the absence of the mating slots 72 in the non-matching mounting rail 58B may serve this purpose.

Because each mounting protrusion 78 on the mounting rail 58 may engage with a respective mounting recess 60 of a circuit breaker 10, the mounting protrusions 78 may define the mounting sites 76 in the panel 22 for installing the circuit breakers 10. In addition, as shown in FIGS. 4 and 6, the panel 22 may also be provided with dividers 82 between the circuit breakers 10 to define the mounting sites 76.

The protrusion 70 on the housing 16 of the circuit breaker 10 may also be useful in preventing damage to the first clip 18, for example, during handling. Since the first clip 18 extends outward from the bottom of the housing 16, the first clip 18 may be subject to being damaged, for example, when a user inadvertently drops the circuit breaker 10. In order to protect the first clip 18 from damage, it may be desirable to provide a protection protrusion 84 that extends out from the housing 16 adjacent the front side of the first electrical clip 18. Although the protection protrusion 84 may provide some protection from damage by itself, the protrusion 70 may provide further protection, especially where the circuit breaker 10 is dropped with a rearward angled orientation. As shown in FIG. 9, the first electrical clip 18 may be located between the protection protrusion 84 and the protrusion 70, with the opening 42 of the first clip 18 facing away from the protection protrusion 84 and facing toward the protrusion 70. Since the protection protrusion 84, first clip 18 and protrusion 70 all extend outward in the same direction, with the clip 18 being between the protrusions 70, 84, the first clip 18 is provided with improved damage protection.

Figure 15:
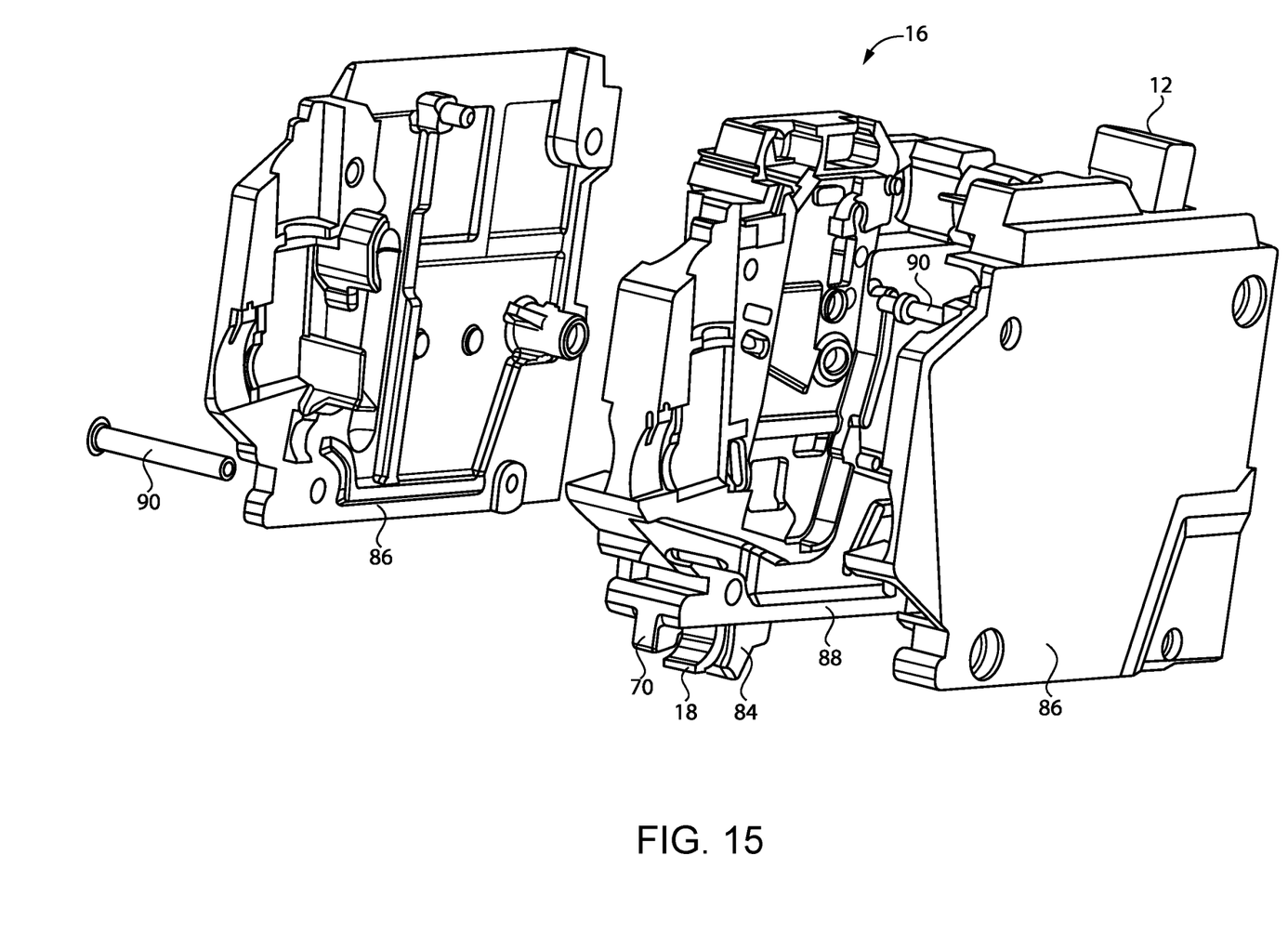
FIG. 15 is an exploded perspective view of a housing for the circuit breaker of FIG. 9.

Preferably, the protrusion 70 is a plastic portion that is integrally molded as part of the plastic housing 16 of the circuit breaker 10. The protection protrusion 84 may also be an integrally molded plastic portion of the plastic housing 16. As shown in FIG. 15, it may be desirable to form the housing 16 from multiple plastic molded sections. For example, the housing 16 may have two outer plastic molded sides 86 and a plastic molded middle section 88 between the sides 86. The sides 86 and middle 88 may be fastened together with rivets 90. As illustrated in FIG. 1, the housing 16 encloses the electrical switch 14 and associated components within the circuit breaker 10. As shown in FIG. 15, it may be desirable to mold the protrusion 70 and the protection protrusion 84 onto the middle plastic section 88. The middle plastic section 88 may also be provided with an opening 92 through which the first clip 18 extends.

Figure 16:
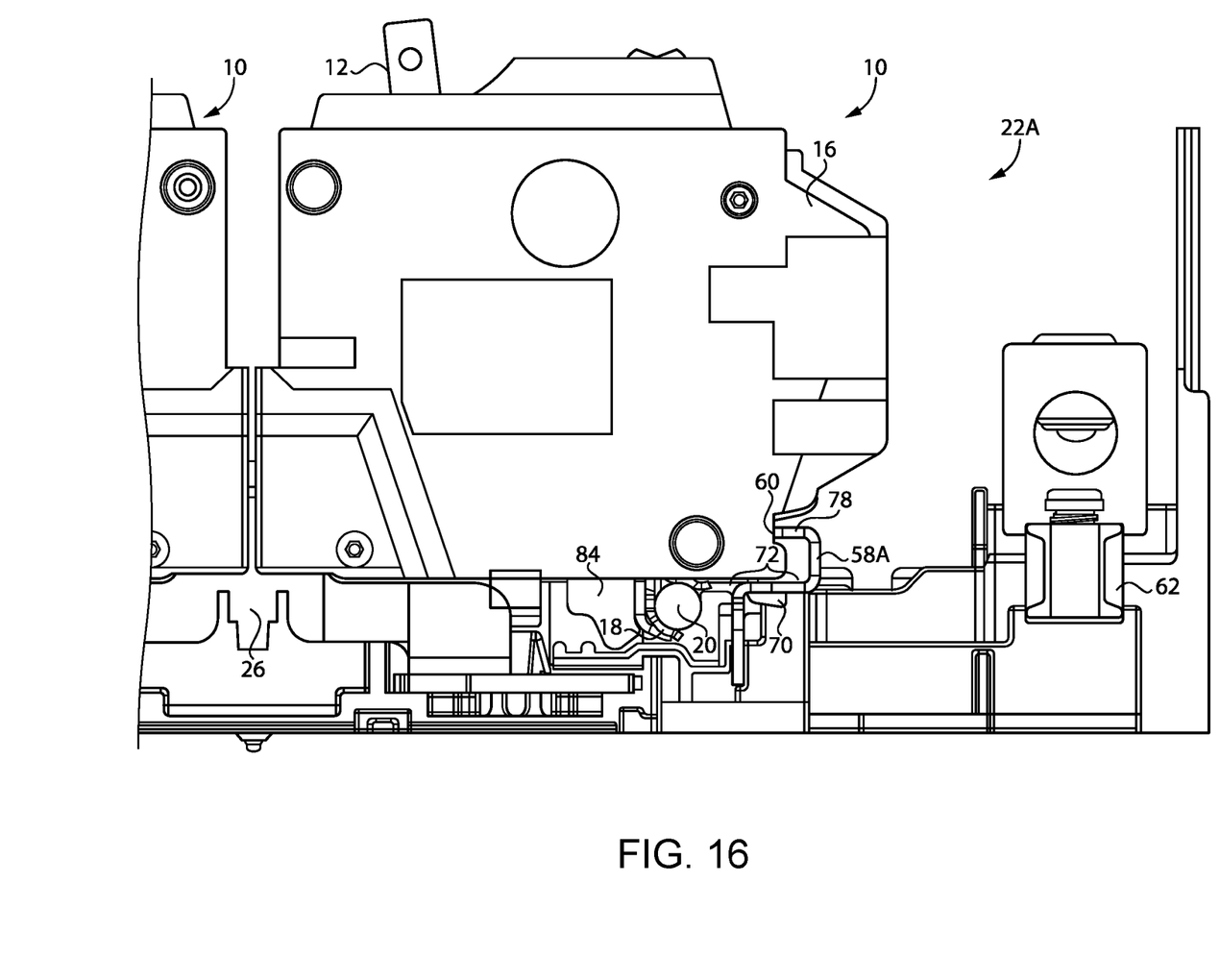
FIG. 16 is a side view of the circuit breaker of FIG. 9 after the circuit breaker has been plugged onto the electrical panel with mating slots.

For illustration, FIG. 16 shows the circuit breaker 10 of FIG. 9 plugged onto an electrical panel 22A having the mounting rail 58A of FIG. 10A-B. As shown, when the circuit breaker 10 is installed onto the electrical panel 22A, the protrusion 70 is inserted into the mating slot 72 of the mounting rail 58A. Thus, the circuit breaker 10 of FIG. 9 would not be able to be installed in an electrical panel 22B with a non-matching mounting rail 58B like FIG. 11 that does not have the mating slots 72 because the protrusion 70 would interfere with the non-matching mounting rail 58B.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A circuit breaker, comprising:
    an electrical switch adapted to open an electrical circuit when an electrical anomaly occurs in the electrical circuit;
    a housing enclosing the electrical switch;
    a switch lever adapted to manually engage and disengage the electrical switch;
    a first electrical clip adapted to electrically contact a neutral bus in an electrical panel;
    a second electrical clip adapted to electrically contact an electrical supply bus in the electrical panel; and
    a protrusion extending outward from the housing, the protrusion adapted to be inserted into a mating slot in the electrical panel when the first electrical clip is connected to the neutral bus and the second electrical clip is connected to the electrical supply bus.

2. The circuit breaker according to claim 1, wherein the housing is plastic and the protrusion is a plastic portion molded onto the housing.

3. The circuit breaker according to claim 2, wherein the housing comprises a first outer plastic molded side, a second outer plastic molded side, and a plastic molded middle section, the first outer plastic molded side, the second outer plastic molded side, and the plastic molded middle section being fastened together to form the housing, wherein the protrusion is molded onto the plastic molded middle section.

4. The circuit breaker according to claim 3, wherein the first electrical clip extends through an opening in the plastic molded middle section.

5. The circuit breaker according to claim 1, wherein the first electrical clip comprises an opening to receive the neutral bus, the opening facing the protrusion, and the first electrical clip and the protrusion extending outward from the housing in a same direction, the protrusion thereby protecting the first electrical clip from damage.

6. The circuit breaker according to claim 1, further comprising a plastic protection protrusion extending out from a housing of the circuit breaker, the plastic protection protrusion being disposed adjacent a front side of the first electrical clip to protect the first electrical clip from damage.

7. The circuit breaker according to claim 6, wherein the first electrical clip comprises an opening to receive the neutral bus, the opening facing away from the protection protrusion and towards the protrusion, and the first electrical clip, the protection protrusion, and the protrusion each extending outward from the housing in a same direction, the first electrical clip being disposed between the protection protrusion and the protrusion such that the protection protrusion and the protrusion protect the first electrical clip from damage.

8. The circuit breaker according to claim 1, wherein the first electrical clip and the protrusion extend outward from the housing in a same direction opposite from the switch lever.

9. The circuit breaker according to claim 1, wherein the first electrical clip comprises a first elastic arm with a first curved inner surface and a second elastic arm with a second curved inner surface, and the neutral bus comprising a bar with a circular cross-section engaged by the first and second curved inner surfaces.

10. The circuit breaker according to claim 9, wherein the first electrical clip comprises an opening between the first and second elastic arms to receive the neutral bus, the opening being angled within a range between 60° and 90° with respect to a vertical axis through the circuit breaker.

11. The circuit breaker according to claim 1, wherein the circuit breaker is a ground fault circuit breaker, an arc-fault circuit breaker or a combined ground fault/arc-fault circuit breaker.

12. The circuit breaker according to claim 1, further comprising an electrical connecting lug, electrical power being supplied from the second electrical clip to the electrical connecting lug when the electrical switch is closed.

13. The circuit breaker according to claim 1, wherein the circuit breaker is rated for 120-240 volts.

14. The circuit breaker according to claim 1, further comprising a mounting recess adapted to receive a mounting protrusion of a mounting rail in the electrical panel, wherein the mating slot is disposed in the mounting rail.

15. An electrical system, comprising:
    the circuit breaker according to claim 14;
    a first electrical panel comprising the neutral bus, the electrical supply bus, and the mounting rail comprising a plurality of the mating slot and a plurality of the mounting protrusion;
    a second electrical panel without the neutral bus and comprising a matching electrical supply bus to the electrical supply bus of the first electrical panel, and a non-matching mounting rail to the mounting rail of the first electrical panel, wherein the non-matching mounting rail comprises a plurality of matching mounting protrusions to the mounting protrusions of the first electrical panel and has no matching mating slots to the mating slots of the first electrical panel;
    wherein the circuit breaker is installable in the first electrical panel and is not installable in the second electrical panel.

16. An electrical system, comprising:
    the circuit breaker according to claim 1;

a first electrical panel comprising the neutral bus, the electrical supply bus, and a mounting rail comprising a plurality of the mating slot;

a second electrical panel without the neutral bus and comprising a matching electrical supply bus to the electrical supply bus of the first electrical panel, and a non-matching mounting rail to the mounting rail of the first electrical panel, wherein the non-matching mounting rail has no matching mating slots to the mating slots of the first electrical panel;

wherein the circuit breaker is installable in the first electrical panel and is not installable in the second electrical panel.

17. An electrical panel comprising the circuit breaker according to claim 1, wherein the electrical panel is adapted to mount a plurality of the circuit breaker thereon, the electrical panel comprising a plurality of defined mounting sites, and each of the circuit breakers being mounted in one of the defined mounting sites.

18. The electrical panel according to claim 17, further comprising a mounting rail extending across the plurality of defined mounting sites and comprising a plurality of the mating slot, the defined mounting sites each comprising one of the mating slots.

19. The electrical panel according to claim 18, wherein the circuit breaker engages the mounting rail at an angle as the circuit breaker is being mounted on the electrical panel, the circuit breaker being rotated downward around the mounting rail to mount the circuit breaker such that, as the circuit breaker is rotated downward, the first electrical clip engages the neutral bus, the second electrical clip engages the electrical supply bus, and the protrusion is inserted into the mating slot.

20. The electrical panel according to claim 19, wherein every one of the defined mounting sites comprises one of the mating slot to receive the protrusion of one of the circuit breakers.

* * * * *